(12) United States Patent
Prampolini et al.

(10) Patent No.: US 8,906,464 B2
(45) Date of Patent: Dec. 9, 2014

(54) CERAMIC MEDIUMS AND INKS IN POWDER FORM

(75) Inventors: Paolo Prampolini, Castelnuovo Rangone (IT); Alan Nappa, Modena (IT); Giuseppe Li Bassi, Gavirate (IT); Giovanni Floridi, Novara (IT)

(73) Assignee: Lamberti SpA, Albizzate (VA) (IT)

( * ) Notice: Subject to any disclaimer, the term of this patent is extended or adjusted under 35 U.S.C. 154(b) by 188 days.

(21) Appl. No.: 13/580,957

(22) PCT Filed: Feb. 22, 2011

(86) PCT No.: PCT/EP2011/052564
§ 371 (c)(1),
(2), (4) Date: Aug. 23, 2012

(87) PCT Pub. No.: WO2011/104216
PCT Pub. Date: Sep. 1, 2011

(65) Prior Publication Data
US 2012/0315401 A1    Dec. 13, 2012

(30) Foreign Application Priority Data

Feb. 23, 2010 (IT) .............................. VA2010A0016

(51) Int. Cl.
| | | |
|---|---|---|
| B05D 3/02 | (2006.01) | |
| C03C 8/16 | (2006.01) | |
| B05D 1/36 | (2006.01) | |
| C09D 5/03 | (2006.01) | |
| C09D 11/00 | (2014.01) | |
| C04B 41/00 | (2006.01) | |
| C04B 41/45 | (2006.01) | |
| C04B 41/52 | (2006.01) | |
| C04B 41/81 | (2006.01) | |
| C04B 41/89 | (2006.01) | |
| C09D 11/037 | (2014.01) | |

(52) U.S. Cl.
CPC ... *C03C 8/16* (2013.01); *B05D 1/36* (2013.01); *C09D 5/03* (2013.01); *B05D 3/02* (2013.01); *C09D 11/00* (2013.01); *C04B 41/009* (2013.01); *C04B 41/4539* (2013.01); *C04B 41/52* (2013.01); *C04B 41/81* (2013.01); *C04B 41/89* (2013.01); *C09D 5/037* (2013.01); *C09D 11/037* (2013.01)
USPC ..... 427/387; 427/393.6; 427/402; 106/31.05; 106/31.6; 106/400; 106/482; 106/499

(58) Field of Classification Search
None
See application file for complete search history.

(56) References Cited

U.S. PATENT DOCUMENTS

2011/0088581 A1* 4/2011 Crespi et al. .................. 101/483

FOREIGN PATENT DOCUMENTS

| WO | WO 2006/134063 A2 * | 12/2006 |
| WO | WO 2008/084042 A1 * | 7/2008 |
| WO | WO 2009/150132 A2 * | 12/2009 |

OTHER PUBLICATIONS

Hawley's Condensed Chemical Dictionary, Twelfth Edition, 1993, p. 487, definition of ethylene glycol.*
Hawley's Condensed Chemical Dictionary, Twelfth Edition, 1993, p. 569, definition of glycol.*

* cited by examiner

*Primary Examiner* — Erma Cameron
(74) *Attorney, Agent, or Firm* — Massman, Kumar & Tyler PC

(57) ABSTRACT

The disclosure relates to printing mediums, useful for ceramic sinterable materials, that are in powder form and are based on glycols, urea and an inorganic absorbent, to ceramic inks compositions comprising the printing mediums and to methods for decorating green or fired ceramic bodies by the use of said printing mediums and compositions.

21 Claims, No Drawings

CERAMIC MEDIUMS AND INKS IN POWDER FORM

This Application claims priority from Italian Patent Application VA2010A000016 which was filed on Feb. 23, 2010; and the PCT Application No.: PCT/EP2011/052564 which was filed on Aug. 23, 2012.

FIELD OF THE INVENTION

The present disclosure relates to printing mediums for ceramic pigments in powder form, to ceramic inks compositions in powder form and to methods for decorating green or fired ceramic bodies by the use of said printing mediums and compositions.

The ceramic inks compositions mainly consist of ceramic pigments, glazes and frits, dispersed in the printing mediums in powder form, which are based on glycols, urea and an inorganic absorbent.

BACKGROUND OF THE ART

Printing mediums for ceramic pigments (ceramic mediums) are generally fluids that are used in the preparation of ceramic inks to disperse ceramic pigments, to regulate their viscosity, flowing properties, and binding-cohesive behaviour.

Most traditional ceramic manufactured products, such as wall tiles and floor tiles, are made of a ceramic body that confers form and mechanical properties to the object; the ceramic body generally has some porosity and poor aesthetic qualities.

Said ceramic body, which is defined "green" or, alternatively, "fired", if previously fired, is then usually coated with ceramic layer, called ceramic glaze; the ceramic glaze is completely sintered by firing, in such a way to gain suitable surface aesthetic qualities and, in the meantime, to become a fluid-proof barrier; as a matter of fact, after firing, the ceramic glaze has usually zero porosity and is generally resistant to abrasion and to the attack of chemical agents such as acids, bases, dyes.

The aesthetic finishing of the ceramic material can be completed by a decoration phase, that is by the application of sinterable and variously coloured ceramic materials (ceramic pigments) which are applied according to a precise drawing (décor).

The decor can be applied either on the green or fired ceramic body, on which the glaze was previously set, or, in the so called third firing decorations, after the firing on the glaze. The main printing techniques used in the decoration either of green or fired ceramic substrate are flat screen printing, rotary screen printing and the decoration by silicone roller (the latter comprising the printing through laser engraved roller, or "rotogravure printing", and the printing through relief engraved roller, or "silicone stamp printing"); the decoration by silicone roller is also called rotogravure.

All these decoration techniques require a series of overlapping printings, one for each of the colours that compose the drawing. Ceramic inks and printing mediums are formulated according to the kind of ceramic body to which they will be applied (green ceramic, fired ceramic, sintered glaze . . . ) and according to the application technique (brush, spatula, screen printing, rotogravure printing . . . ).

In the preparation of ceramic inks for the screen printing or rotogravure decorations of green or fired ceramic bodies, liquid printing mediums based on mixtures of water and glycols and normally containing additives, such as rheology modifiers, binders and plasticizers, are generally used.

Traditional liquid printing mediums contain large amounts of water, usually about 50% wt of water; their transportation and storing costs are economically and energetically relevant.

Moreover, liquid printing mediums shall be stored in drums or tanks and, because of the variety of slightly different mediums that are normally used in an industrial plant, drums and tanks often need washing cycles with additional spoil of water and heavy duty detergents.

Therefore, it would be advantageous to provide concentrated ceramic mediums in powder form having good versatility.

In the prior art, BR PI0503487 describes a solid ceramic ink which is ready for use after dilution in water and contains frit, binder, thickening agent, antifoam and preserving agent; however BR PI0503487 does not disclose a solid powdery medium.

BR PI92202137 describes a silk print ceramic ink, in the form of paste, that contains a frit and a possibly waterless thixotropic medium, which comprises polyethylene glycol; however, also BR PI92202137 does not disclose a solid powdery medium.

It has now been found that free-flowing mixtures of inorganic absorbent, glycol, urea, and optionally conventional ingredients of ceramic mediums, can be prepared in the form of powder and used as concentrated ceramic mediums.

These concentrated ceramic mediums can be diluted in water and mixed with ceramic pigments to give ceramic inks with proper stability and rheology.

Alternatively, they can be mixed (or milled) with ceramic pigments to give ceramic inks compositions in powder form, which can be diluted in water before use to provide liquid ceramic ink; or, in another embodiment, the they can be milled together with the ceramic pigments and water to give in one step a liquid ceramic ink.

The powdery ceramic mediums of the present disclosure provide ceramic inks that allow the realisation of decors having comparable or improved definition with respect to inks obtained using traditional liquid mediums.

SUMMARY OF THE DISCLOSURE

In one aspect, the present disclosure relates to a mixture in powder form comprising:
  a) from 5 to 50% wt, preferably from 10 to 30% wt, of an inorganic absorbent
  b) from 10 to 50% wt, preferably from 15 to 40% wt, of a glycol
  c) from 20 to 70% wt, preferably from 30 to 60% wt, of urea
  d) from 0.1% to 10% of a rheology modifier
which can be used as concentrated ceramic medium.

In another aspect, the present disclosure relates to a ceramic ink composition in powder form which is useful for the flat screen printing, or rotary screen printing, or rotogravure decoration of green or fired ceramic bodies and consists of from 30 to 80% wt by weight of ceramic pigments and from 20 to 70% wt of the above concentrated ceramic medium.

According to still another aspect, the disclosure is a method for decorating green or fired ceramic bodies comprising the following steps:
  i. the above concentrated ceramic medium is prepared;
  ii. the concentrated ceramic medium is dispersed in from 50 to 100 parts by weight of water to obtain a liquid ceramic medium;

iii. a liquid ceramic ink composition is prepared by mixing from 30 to 70 parts by weight of ceramic pigments with from 30 to 70 parts by weight of the liquid ceramic medium;
iv. a glaze is spread on the surface of the green or fired ceramic body;
v. the decoration is made by means of flat screen printing, or rotary screen printing, or rotogravure, by using one or more liquid ceramic inks prepared according to the steps i. to iii.;
vi. the obtained substrate is fired at a temperature comprised between 900 and 1250° C. for 15-240 minutes.

According to a further aspect, the disclosure is a method for decorating green or fired ceramic bodies comprising the following steps:
i. a ceramic ink composition in powder form is prepared by mixing from 30 to 80 parts by weight of ceramic pigments with from 20 to 70 parts by weight of the above concentrated ceramic medium;
ii. the ceramic ink composition in powder form is dispersed with from 30 to 70 parts by weight of water, to obtain a liquid ceramic ink;
iii. a glaze is spread on the surface of the green or fired ceramic body;
iv. the decoration is made by means of flat screen printing, or rotary screen printing, or rotogravure, by using one or more liquid ceramic inks prepared according to steps i. and ii.;
v. the obtained substrate is fired at a temperature comprised between 900 and 1250° C. for 15-240 minutes.

According to still a further aspect, the disclosure is a method for decorating green or fired ceramic bodies comprising the following steps:
i. a liquid ceramic ink composition is prepared by homogenising in a turbine mixer or by milling from 30 to 80 parts by weight of ceramic pigments and from 20 to 70 parts by weight of the above concentrated ceramic medium with water;
ii. a glaze is spread on the surface of the green or fired ceramic body;
iii. the decoration is made by means of flat screen printing, or rotary screen printing, or rotogravure, by using one or more liquid ceramic inks prepared according to step i.;
iv. the obtained substrate is fired at a temperature comprised between 900 and 1250° C. for 15-240 minutes.

DETAILED DESCRIPTION

The powdery mixture comprising a) from 5 to 50% wt of inorganic absorbent, b) from 10 to 50% wt of glycol and c) from 20 to 70% wt of urea advantageously additionally comprises up to 15% wt of conventional organic ingredients of ceramic printing mediums, such as binders, plasticizers, preservative agents, anti-foam agents, dispersants and water retention agents.

The inorganic absorbents which may be employed to prepare the concentrated ceramic mediums of the disclosure are water-insoluble chemically non-reactive inorganic powders which are capable of absorbing liquids without losing their powdery form.

Examples of inorganic absorbents are precipitated silica, silica gel, calcium silicates and alumina.

Other microcrystalline materials which are suitable are aluminates, clays, including kaolin, bentonites, calcinated kaolin, molochite, zeolites, montmorillonites and the like.

The inorganic absorbent which is particularly preferred for the realization of the present invention is precipitated silica.

Precipitated silica is a highly absorbent material and consists of a three-dimensional network of coagulated primary silica particles; the latter grow to sizes higher than 4-100 nm before they coagulate to form the aggregated clusters, or agglomerate, having size from about 1 to 40 μm and average pore size >30 nm; the precipitated dried silica may be subjected to milling and classifying steps to obtain specific particle size distribution.

The use of precipitated silica as the inorganic absorbent is preferred because it confers excellent rheology stability to the final liquid ceramic inks.

The glycols of the concentrated ceramic mediums of the invention are water-soluble products.

Preferably they are selected among monopropylene glycol (MPG), dipropylene glycol (DPG), monoethylene glycol (MEG), diethylene glycol (DEG), glycerin and polyethylene glycol having average molecular weight below 5,000 (PEG), and mixtures thereof.

More preferably the glycol is liquid at standard conditions; most preferably the glycol is monoethylene glycol.

Urea is a low cost non noxious industrial product that is largely used in agriculture and even in personal care products, such as soaps, toothpaste, detergents.

Both purified and technical grade commercial urea can be used for the preparation of the powdery ceramic mediums of the invention.

The preparation of the concentrated ceramic medium according to the invention can be performed by mixing to homogeneity the glycol and the inorganic absorbent, which is preferably precipitated silica, and adding urea and the additional conventional ingredients onto the resulting mixture, in the proper quantities, and further homogenising.

Preferably, urea is grinded with a hammer mill before being added to the glycol-absorbent mixture.

The resulting powdery, free-flowing mixture can be used as such to formulate ceramic ink composition in powder form or to provide liquid ceramic mediums upon dilution with water.

According to one embodiment of the disclosure a liquid ceramic ink is prepared by diluting the powdery free-flowing mixture in water and subsequently mixing the thus obtained liquid medium with the ceramic pigments and other possible solid components of the ink.

According to another embodiment of the disclosure, a ceramic ink composition in powder form is prepared by mixing (or milling) the above powdery free-flowing mixture with ceramic pigments and other possible solid components of the ink.

The preparation of the ceramic ink can also be made by homogenising the concentrated ceramic medium in powder form with the rest of solid components (frits, glazes and pigments) and water to give in one step a liquid ceramic ink.

In order to help regulating the final viscosity of the liquid medium and ink, the concentrated ceramic medium of the disclosure comprises from 0.10 to 10% by weight of a rheology modifier.

Preferred rheology modifiers are modified natural polymers, such as hydroxyethyl cellulose, carboxymethyl cellulose, hydroxypropyl guar and hydroxypropyl starch and synthetic polymers, such as polyacrylic thickeners; it is also possible to use mixtures of rheology modifiers having different thickening properties and different rheological behaviour.

Viscosity and pseudoplasticity are regulated, according to what is well known to those skilled in the art, by the amount of water and by the amount and kind of rheology modifier.

After dilution with water, the ceramic mediums are fluids with homogeneous aspect and viscosity comprised between 30 and 1000 mPa·s, measured by means of a Haake rheometer between 0.1 and 1,000 sec$^{-1}$.

Mediums having low viscosity (30-100 mPa·s) and newtonian or lightly pseudoplastic behaviour are used when a rotogravure printing ceramic ink is to be prepared; mediums having higher viscosity (100-1,000 mPa·s) and more pseudoplastic behaviour are used when a ceramic ink for flat or rotary screen printing is to be prepared. The viscosity and pseudoplasticity of the liquid mediums and inks may be then further regulated by addition of more rheology modifiers, according to the type of printing technique selected for the decoration, as it is well known in the art.

The ceramic pigments useful in the ceramic inks of the invention are solid sinterable materials, that means that they are transformed in ceramic during the firing process; these are oxides, pigments, frits, glasses and other ceramic materials; they are in the form of solid particles having dimensions varying from 0.5 to 100 microns. Typically, they include iron, titanium, chromium, zinc, magnesium, aluminium, cobalt, and cadmium oxides, and zirconium and praseodymium silicates.

The viscosity of the liquid ceramic inks that can be obtained by diluting in water the powdery ceramic ink composition of the disclosure, measured with a Haake rheometer between 0.1 and 200 s$^{-1}$, is between 50 and 2,000 mPa·s, as it is usual in the field.

EXAMPLES

All the viscosities reported in the present text were measured with a Haake rotational rheometer; the viscosity measures were performed through flow curves at "controlled shear rate" between 1 and 200 sec$^{-1}$.

Example 1

Mediums 1-7

Six concentrated mediums in powder form are prepared by firstly preparing the glycol/absorbent mixture, and then by adding urea and the other ingredients.

A comparative dry medium is prepared by homogenising a high molecular weight glycol (PEG 6,000) with urea and the other ingredients.

The composition of the mediums is reported in Table 1, where the ingredients and their dosage are indicated (% wt).

TABLE 1

| Medium | Glycerin | MEG | PEG 4,000 | PEG 6000 | Precipitated silica | Clay | Urea | Add.[1] |
|---|---|---|---|---|---|---|---|---|
| 1 | — | 10 | — | — | 20 | — | 57 | 13 |
| 2 | — | — | 15 | — | — | 35 | 42 | 8 |
| 3[2] | — | — | — | 50 | — | — | 40 | 10 |
| 4 | — | — | 40 | — | — | 20 | 39 | 1 |
| 5 | 10 | — | — | — | 20 | 5 | 58 | 7 |
| 6 | 15 | 15 | — | — | — | 33 | — | 30 | 7 |
| 7 | 20 | — | — | — | — | 25 | — | 47 | 8 |

[1]additives (rheology modifier, preserving agent, dispersant, binder, defoamer
[2]comparative Example 2

Preparation of Ceramic Inks and Ceramic Decorations

Seven powdery dry ceramic ink compositions were prepared by mixing in a mill each of the mediums prepared in Example 1 with a mixture of ceramic pigments in the proportion by weight indicated in Table 2 (the ink composition I1 is prepared from the medium 1, the ink composition I2 from medium 2, and so on).

TABLE 2

| Ink Composition | Medium | Parts by weight of medium | Parts by weight of ceramic pigments |
|---|---|---|---|
| I1 | 1 | 37.5 | 62.5 |
| I2 | 2 | 30 | 70 |
| I3 | 3 | 25 | 75 |
| I4 | 4 | 40 | 60 |
| I5 | 5 | 20 | 80 |
| I6 | 6 | 32.5 | 67.5 |
| I7 | 7 | 30 | 70 |

The ink compositions I1, I2, I3 and I4 were then diluted with 50 parts by weight of water while the ink compositions I5, I6 and I7 were diluted with 40 parts by weight of water, to give seven stable ready for use liquid ceramic inks (respectively LI1, LI2, LI3, LI4, LI5, LI6 and LI7). The viscosity and stability of the liquid ceramic inks are reported in Table 3.

The viscosity ($Vp_0$) is the average viscosity in mPa·s, measured within 1 hour from preparation of the ink.

The viscosity ($Vp_{72h}$) is the average viscosity in mPa·s, measured after 72 hours from preparation of the ink.

An ink is considered "insufficiently stable" (−) if it presents sedimentation phenomena or lumps formation when stored at room temperature for 72 hour after its preparation.

An ink is considered "sufficiently stable" (+) if it does not presents sedimentation phenomena or lumps formation when stored at room temperature for 72 hour after its preparation.

An ink is considered "stable" (++) if it does not present separation phenomena or lumps formation after storing at room temperature for 72 hour after its preparation and additionally has $Vp_{72h}=\pm10\%\ Vp_0$. Inks LI1 to LI4 were applied through rotogravure; inks LI5 to LI7 were applied by silk screen printing on the same support. Afterwards, the drying time of the thus obtained decor (Drying t) and, visually after drying, the definition quality of the decor itself (D) were determined.

The results are reported in Table 3.

The results of Table 3 show that the inks, prepared with the powdery concentrated mediums of the disclosure have good rheological behaviour, sufficient stability and perform well, although the liquid inks obtained from the concentrated mediums that contain precipitated silica as the absorbent give a sensibly better performance, having excellent drying time and stability.

TABLE 3

| Ink | $Vp_0$ | $Vp_{72h}$ | Stable | Drying † (sec) | D |
|---|---|---|---|---|---|
| LI1 | 170 | 181 | ++ | 12" | good |
| LI2 | 800 | 920 | + | 15" | Good |
| LI3* | 940 | 980 | − | 7" | Good |
| LI4 | 850 | 950 | + | 5" | Good |

TABLE 3-continued

| Ink | $Vp_0$ | $Vp_{72h}$ | Stable | Drying † (sec) | D |
|-----|-----|-----|-----|-----|-----|
| LI5 | 200 | 210 | ++ | 10" | Good |
| LI6 | 230 | 240 | ++ | 9" | Good |
| LI7 | 220 | 230 | ++ | 8" | Good |

*comparative

The invention claimed is:

1. A composition comprising:
   a) from about 5 to about 50% wt of an inorganic absorbent,
   b) from about 10 to about 50% wt of a glycol,
   c) from about 20 to about 70% wt of urea, and
   d) from about 0.1% to about 10% of a rheology modifier; wherein the composition is in the form of a powder.

2. The composition of claim 1 wherein the inorganic absorbent is present at a concentration of from about 10 to about 30% wt; the glycol is present at a concentration of from 15 to 40% wt; and the urea is present at a concentration of from about 30 to about 60% wt.

3. The composition of claim 1 additionally comprising up to about 15% wt of conventional organic components used in preparing ceramic printing mediums selected from the group consisting of binders, plasticizers, preservative agents, anti-foam agents, dispersants, water retention agents and combinations thereof.

4. The composition of claim 1 wherein the inorganic absorbent is selected from the group consisting of precipitated silica, silica gel, calcium silicates, alumina, aluminates, clays and combinations thereof.

5. The composition of claim 4 wherein the inorganic absorbent is precipitated silica.

6. The composition of claim 1 wherein the glycol is selected from the group consisting of monopropylene glycol (MPG), dipropylene glycol (DPG), monoethylene glycol (MEG), diethylene glycol (DEG), polyethylene glycol having average molecular weight of less than about 5,000 (PEG), and combinations thereof.

7. The composition of claim 6 wherein the glycol is monoethylene glycol.

8. A ceramic ink powder comprising from about 30 to about 80% wt of ceramic pigments and from about 20 to about 70% wt of a concentrated ceramic medium wherein the concentrated ceramic medium comprises:
   a) from about 5 to about 50% wt of on inorganic absorbent,
   b) from about 10 to about 50% wt of a glycol,
   c) from about 20 to about 70% wt of urea, and
   d) from about 0.1% to about 10% of a rheology modifier; and wherein the concentrated ceramic medium is a powder.

9. A method for decorating green or fired ceramic bodies comprising:
   dispersing a concentrated ceramic medium comprising:
   a) from about 5 to about 50% wt of an inorganic absorbent,
   b) from about 10 to about 50% wt of a glycol,
   c) from about 20 to about 70% wt of urea, and
   d) from about 0.1% to about 10% of a rheology modifier, in water to form a liquid ceramic medium in powder form;
   preparing a ceramic ink composition by mixing ceramic pigments with the liquid ceramic medium;
   applying a glaze to the surface of the green or fired ceramic bodies;
   applying the ceramic ink to the surface of the green or fired ceramic bodies; and
   firing the green or fired ceramic bodies.

10. The method of claim 9 wherein the concentrated ceramic medium is dispersed in water at a wt-part ratio of concentrated ceramic medium to water of from about 1:1 to about 2:1.

11. The method of claim 9 wherein the wt-part ratio of ceramic pigments to liquid ceramic medium is from about 20:80 to about 80:20.

12. The method of claim 11 wherein the wt-part ratio of ceramic pigments to liquid ceramic medium is from about 30:70 to about 70:30.

13. The method of claim 9 wherein the green or fired ceramic body upon which the ceramic ink has been applied is fired at a temperature of from about 900 ° C. to about 1250 ° C. for from about 15 to about 240 minutes.

14. The method of claim 11 wherein the liquid ceramic ink composition is prepared by homogenizing 30 to 80 parts by weight of ceramic pigments and from 20 to 70 parts by weight of the concentrated ceramic medium.

15. The method of claim 14 wherein the ceramic pigments and the concentrated ceramic medium are homogenized in a turbine mixer or in a mill.

16. The method of claim 9 wherein the inorganic absorbent is present at a concentration of from about 10 to about 30% wt; the glycol is present at a concentration of from 15 to 40% wt; and the urea is present at a concentration of from about 30 to about 60% wt.

17. The method of claim 9 wherein the concentrated ceramic medium additionally comprises up to about 15% wt of conventional organic ingredients used in preparing ceramic printing mediums selected from the group consisting of binders, plasticizers, preservative agents, anti-foam agents, dispersants, water retention agents and combinations thereof.

18. The method of claim 9 wherein the inorganic absorbent is selected from the group consisting of precipitated silica, silica gel, calcium silicates, alumina, aluminates, clays and combinations thereof.

19. The method of claim 18 wherein the inorganic absorbent is precipitated silica.

20. The method of claim 9 wherein the glycol is selected from the group consisting of monopropylene glycol (MPG), dipropylene glycol (DPG), monoethylene glycol (MEG), diethylene glycol (DEG), polyethylene glycol having average molecular weight of less than about 5,000 (PEG), and combinations thereof.

21. The method of claim 20 wherein the glycol is monoethylene glycol.

* * * * *